(12) United States Patent
Sur et al.

(10) Patent No.: US 9,218,041 B2
(45) Date of Patent: Dec. 22, 2015

(54) ADAPTIVE THERMAL CONTROL OF ELECTRONIC DEVICES

(71) Applicant: INTEL CORPORATION, Santa Clara, CA (US)

(72) Inventors: Biswajit Sur, Santa Clara, CA (US); Thomas E. Walsh, Banks, OR (US); Ajay G. Gupta, Portland, OR (US); Brian C. Kluge, Chandler, AZ (US); Kristoffer D. Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 13/730,527

(22) Filed: Dec. 28, 2012

(65) Prior Publication Data

US 2014/0189404 A1    Jul. 3, 2014

(51) Int. Cl.
*G06F 1/32* (2006.01)
*G06F 1/20* (2006.01)
*G06F 21/00* (2013.01)

(52) U.S. Cl.
CPC .............. *G06F 1/3234* (2013.01); *G06F 1/206* (2013.01); *G06F 1/3209* (2013.01); *G06F 21/00* (2013.01)

(58) Field of Classification Search
CPC ..... G06F 1/3234; G06F 1/3209; G06F 1/206; G06F 21/00
See application file for complete search history.

(56) References Cited

U.S. PATENT DOCUMENTS

| 7,865,253 | B2 * | 1/2011 | Harrington | 700/21 |
|---|---|---|---|---|
| 8,766,919 | B1 * | 7/2014 | Lachwani et al. | 345/168 |
| 2003/0159074 | A1 * | 8/2003 | Oar et al. | 713/300 |
| 2006/0279250 | A1 * | 12/2006 | Keely et al. | 320/103 |
| 2007/0162582 | A1 * | 7/2007 | Belali et al. | 709/223 |
| 2007/0238440 | A1 * | 10/2007 | Sengupta et al. | 455/343.2 |
| 2008/0253015 | A1 * | 10/2008 | Harrington | 360/75 |
| 2008/0280656 | A1 * | 11/2008 | Gonikberg et al. | 455/572 |
| 2010/0235504 | A1 * | 9/2010 | Sengupta et al. | 709/224 |

* cited by examiner

*Primary Examiner* — M Elamin
*Assistant Examiner* — Abdelmoniem Elamin
(74) *Attorney, Agent, or Firm* — KED & Associates LLP

(57) ABSTRACT

An apparatus includes logic to control heat generation in a device. The device to operate at least in one of a first state and a second state, wherein the device to consume more power in the first state than in the second state. The device to connect to a network at least for a portion of time while in the second state. The logic to select a plurality of thermal control solutions to decrease the generation of heat in the device in the second state, the selected thermal control solution to be performed while the device is in the second state to reduce the generated heat to below a predetermined level.

33 Claims, 6 Drawing Sheets

ADAPTIVE THERMAL CONTROL OF ELECTRONIC DEVICES

FIELD

One or more embodiments herein relate thermal control of electronic devices.

BACKGROUND

Power and thermal management of electronic devices continues to be a focus of system designers. Much of this focus is concentrated on improving the power and thermal efficiency and control of mobile devices which are battery powered and equipped with one or more communication circuits. The power consumed and heat generated increases as the number of active hardware and software platform components increases during any given time. This tends to limit performance, usefulness, and may even limit the useful life of the device.

DETAILED DESCRIPTION

Mobile platforms such as ultrabooks, tablets, notebooks and netbooks are evolving to provide instant response and instant connectivity to keep contents refreshed and always be reachable so end users can have similar usage models on these platforms as on smart phones. This may be accomplished using either pull or push operations.

In a pull operation the platform triggers a read from a network, and in a push operation a service pushes content to the platform. These operations may be performed using mechanisms that depend on network connectivity capabilities. Generally, "always connected" platforms use cellular (WWAN) or WiFi connectivity and "occasionally connected" platforms use mainly WiFi or wired connectivity. Mobile platforms must support both pull-based mechanisms for "occasionally connected" platforms and push-based mechanisms for "always connected" platforms.

Establishing network connectivity in this manner has proven useful to users. However, when ultrabooks, tablets, notebooks, netbooks and other devices transition into a sleep or lower power state during unattended mode, where the push and pull operations performed during full-power operation are not conventionally performed. This presents a disadvantage to users as connectivity to and notifications for email and social networks are not available during these lower power unattended states.

Intel Smart Connect Technology provides capability for frequent network connections during the unattended state, thereby enhancing functionality ('fresh data') and allowing tablets, ultrabooks, etc., to operate in a manner similar to smart phones. While this enhanced connectivity is desirable, at the same time additional power is consumed. Therefore, development of a management approach that reduces or minimizes consumption of power during unattended-state connectivity is highly desirable.

Figure 1:
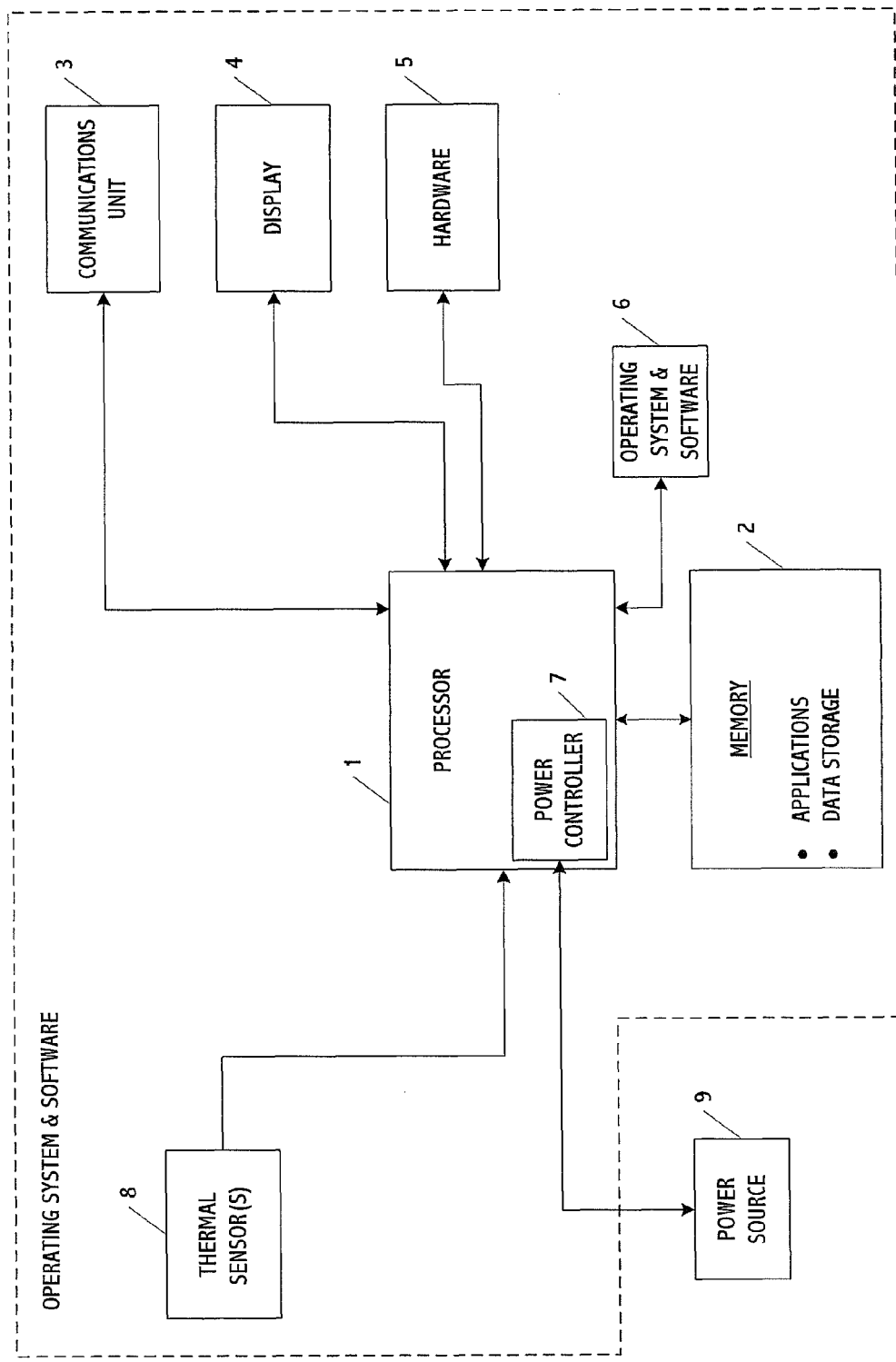
FIG. 1 shows one embodiment of an adaptive thermal control apparatus.

FIG. 1 shows one embodiment of an apparatus for performing adaptive thermal control of an electronic device. The device may be a stationary or mountable device such as a desktop computer or all-in-one system, or the device may be any one of a number of mobile devices including but not limited to ultrabooks, notebooks, so-called netbooks, pad- or pod-type devices, smart or other types of phones, data terminals, navigation system and media players. One or more embodiments of the apparatus are especially suitable for use with a device having various types of network connectivity.

For a network-connected device, software and/or circuits may be included for providing instant response and connectivity and/or for keeping contents refreshed and always connected or otherwise accessible to end-users. This may be accomplished by executing pull and push operations. A pull operation may be implemented by a controller triggering a read of information from a network, and a push operation may involve a network service sending and storing contents on the device without the contents being requested by the device controller.

The ability to perform these pull and push operations may depend on the connectivity state of the device relative to the network. Examples of the network include a cellular (e.g., wireless wide area network (WWAN)) or other type of mobile communication network, networks corresponding to or connected to the internet, networks based on wired or wireless fidelity (WiFi) connection, and other types of short-range or longer range links.

In accordance with one embodiment, the network-connected device may operate in at least first and second states. The first state may correspond to or include an attended state and the second state may correspond to or include an unattended state. In the attended state, the device may be operational and active for use by a user with full power being supplied to sustain operation. During this state, network connectivity may be continuous or immediately available to a user.

In the unattended state, the device may not be fully operational or active and generally is sent to a lower power sleep state to conserve power. In this state, network connectivity may not be continuous or immediately available but rather may be limited and only established, for example, intermittently, periodically, or at other times as set by control software. In other embodiments, the device may be a standalone device with no network connectivity circuits.

More specifically, in the unattended state, a wake operation may be performed or a wake period may be included and correspond to a time when network connectivity is temporarily established or available on a limited basis. A wake operation may be performed, for example, to allow the device to check the status of network information, to receive information from the network, to send information to the network and/or for another reason determined, for example, by the type and/or applications or functions resident on the device. In one case, an update period or update operation may be performed during a wake period to allow the device to check, receive, or send email or other types of messages, to receive information that initiates a notification on the device and/or to receive update information for an application as well as for other reasons.

In accordance with one implementation, network connectivity may be periodically established during the unattended state to check email or a social media website. Information from email servers or websites may be updated, for example, based on pull operations that are periodically performed for a short period of time. During this time, the device may transition from a lower-power state to a higher power state in order to allow content to be pulled from the network. After the wake-up period expires and/or the update operation is completed, the device may transition back to a lower power state and network connectivity may be ended until the next wake or update period or until the device transitions back into the attended state.

An example of a higher power state may be an attended active (S0) state, and examples of lower power states may include a sleep state (S1, S2, S3), hibernation state (S4) and soft-off state (S5). These "S" states correspond to Advanced Configuration and Power Interface (ACPI) states often implemented on a computer. While examples of ACPI states have been given, a different set of lower power states may be used in other embodiments.

The thermal conditions of the device changes based on its state of operation. In the attended state, the device may be fully operational and a greater amount of power is consumed. As a result, a greater amount of thermal energy (heat) is generated which raises the temperature of the device over time and usage.

In the unattended state, the system is generally sent to sleep to conserve power and thermals. However, introduction of frequent wake-up events (e.g., transitions from low power sleep to active state) to receive updates or to otherwise establish network connectivity may, over time, cause a significant rise in thermal energy. Being inside a bag the system is incapable of dissipating heat properly and may reach an unacceptable device temperature.

An explanation of how these temperatures may rise in the unattended state of a system with frequent wake-up events is given relative to the device of FIG. 1. As shown, this device may include a processor 1, a memory 2, a communications unit 3, a display 4, and a plurality of additional hardware components 5. These features may be included in a section of the device which may be generally referred to as operating system and software.

The processor may be a central processing unit (CPU) or other type of controller for executing operating system and software 6 for controlling the device. The operating system and software may be stored in a storage area located on a same chip as the CPU or may be located off-chip in a separately provided storage area coupled to the processor. The software may include firmware, basic input/output system (BIOS) software, and/or middleware as well as other code and instructions for guiding operation of the device.

The processor may also include a power controller 7 to control the amount of power to be supplied to one or more circuits, platforms, functions, or subsystems of the device. The power control circuit regulates the amount of power, for example, based on management instructions included in the operating system software or in software otherwise accessible by the processor. The power control circuit is coupled to a power source 9, which, for example, may be a battery or power from a wall outlet. In other embodiments, the power controller may be a circuit separate from but which acts in cooperation with the processor to control power in the device.

The memory 2 may store software corresponding to a variety of applications and data. The data may correspond to documents, text or message files, media files, and/or other types of information for supporting or interacting with the applications and/or systems or subsystems of the device. The memory may further store information to be received during a wake or update operation performed while the device is in the unattended state.

The communications unit 3 may provide a connection to one or more types of networks including WiFi and/or cellular. The communications unit may also provide one or more types of local links such as Bluetooth. This unit may be controlled by the processor to transition between active and inactive or lower power based on the attended and unattended states previously mentioned. The display and hardware components may correspond to other functions or subsystems of the host device, which may also transition between active and inactive states in order to save power and prevent the generation of excessive thermal energy.

One or more thermal sensors 8 may also be included for providing sensor signals to the processor. The sensors may include ones located on the skin (e.g., outer housing) of the device and one located within the housing, for example, coupled to a specific circuit or electronics platform.

The transition between attended and unattended wake/update states and the active condition of the various components of the device during these states may be controlled by a software, firmware, or hardware. This control may be implemented in connection with Intel Smart Connect Technology (iSCT) and/or another type of program or connectivity tool that manages the states of the network communications unit and other components of the device.

Figure 2:
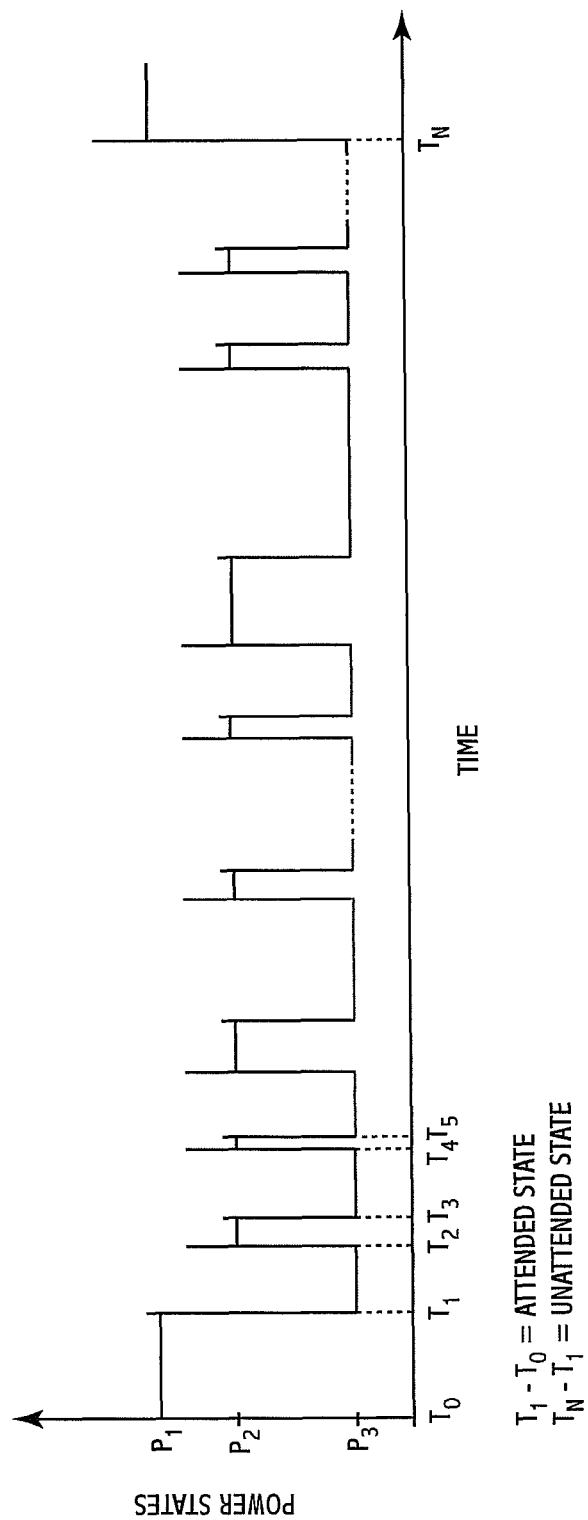
FIG. 2 shows power levels of a device in different operational modes.
Figure 3:
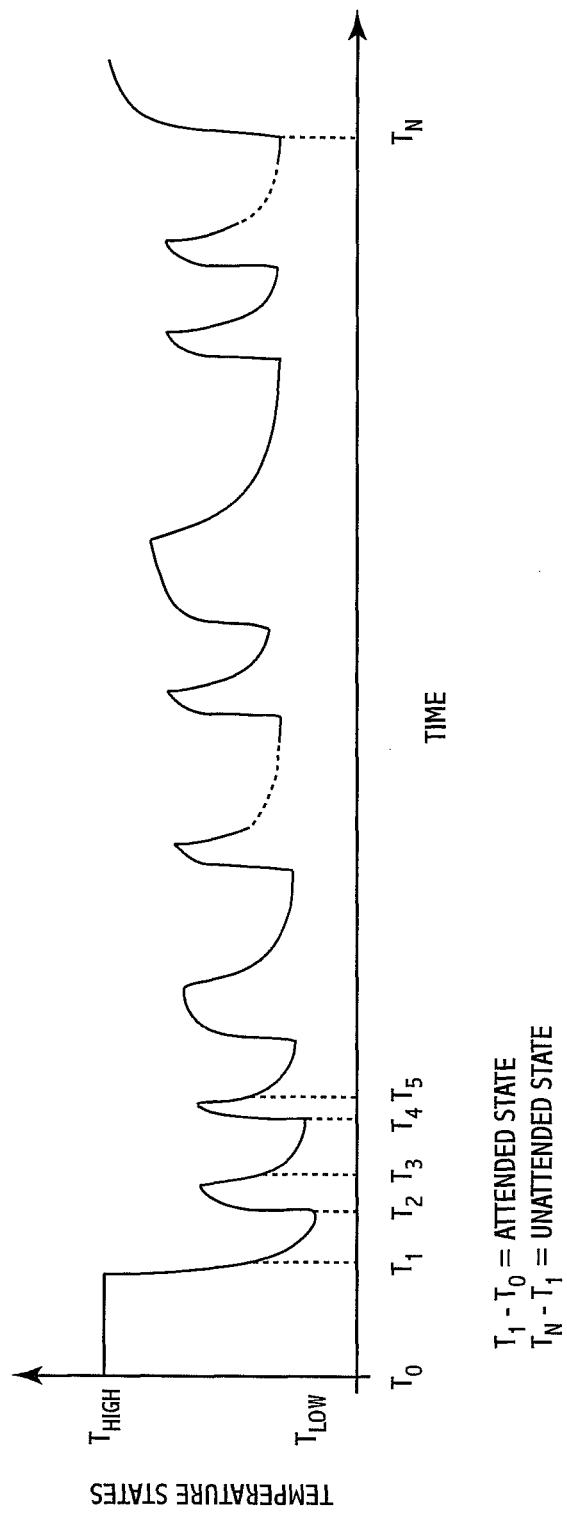
FIG. 3 shows temperature state of the device during the levels in FIG. 2.

FIG. 2 shows an example of an unattended wake/update use illustration and the corresponding system activities and power states. FIG. 3 shows a timing diagram of temperature states corresponding to the power levels in FIG. 2.

The power-level timing diagram of FIG. 2 corresponds to two states of operation of the device. The first state of operation corresponds to an attended state in which the device operates at a first power level $P_1$ and the second state of operation corresponds to an unattended state in which the device operates in various lower power states illustrated by $P_2$ and $P_3$. The first state of operation may be an attended state which exists between times $T_0$ and $T_1$, and the second state of operation may be an unattended state which exists after time $T_1$.

In one implementation, the first power level may correspond to an active or full power state, e.g., power state S0 according to the ACPI standard. The second and third power levels may correspond to sleep or other lower power states. The lower power states may be implemented by iSCT or another type of control software.

Between times $T_0$ and $T_1$, the device is operating at full power $P_1$ in the attended state. As previously indicated, in the attended state the device may be continuously connected to one or more networks (e.g., WiFi and a mobile network) and the processor may be running various applications and/or hardware components (e.g., fan, light emitting diodes (LEDs), display, communication circuits, other platforms or components, etc.) in the $P_1$ power state. Examples of mobile networks include Global System for Mobile (GSM) communications, code division multiple access (CDMA), or any one of a number of other network communication standards.

At time $T_1$, the device enters lower power sleep state $P_3$. This may occur automatically, for example, as a result of a control operation of the processor after a period of inactivity or may occur manually as a result of a setting entered by a user. When the transition occurs to the $P_3$ state, the temperature of the device rapidly falls from a high level $T_{High}$. While entering P3 state, the device power may experience a small spike in power which may or may not contribute significantly to an increase in temperature of the device.

Between times $T_1$ and $T_2$, the device operates in the lower power sleep state, for example, while maintaining a very minimum number of functions. These functions may include monitoring receipt of a call (if the device is a mobile phone) or one or more other function depending, for example, on the type of device and its operating system. During this time period (which, for example, may be considered to be in a sleep state), the temperature of the device falls to $T_{Low}$, which may or may not be a minimum low operating temperature of the device.

Because the device is in a low power sleep state at this time, a user may place the device in a holster, bag, or other container which has insulative or poor air-flow qualities. When placed in this manner, the heat generated from the device may be trapped and contribute to causing the device to rise in temperature, even though the device is in a lower power state.

Throughout the unattended state, the operating system may cause the device to wake-up at various times. For example, the operating system may wake-up in order to receive an update to a particular application such as email or a social network. Waking up requires the device to change from the lower power state $P_3$ to a higher power state, which, for example, may correspond to state $P_2$. Such a transition takes place at time $T_2$, which may be accompanied by a large spike in power.

The additional power in the $P_2$ unattended wake/update state continues as the processor and communication circuits receive new emails, new messages (either from a social networking site, an instant messaging function, or both), notifications in connection with another application or software or other device updates.

Between $T_2$ and $T_3$, the device continues to operate in this unattended wake/update state, during which time temperature of the system may sharply rise as a result of the increased power level. The duration of the time period between $T_2$ and $T_3$ may be determined by the network traffic, the operating system, a timer function or circuit, and/or the types of operations to be performed by the device during this interval. At time $T_3$, the operating system may cause the device to transition to a lower power sleep state, which, for example, may be the same lower power state $P_3$ or another lower power level. This produces a rapid temperature reduction.

Between $T_3$ and $T_4$, the operating system places the device in another inactive period. During this time, the temperature continues to fall. At time $T_4$, another wake and update operation may be performed. Because of the cumulative heat generated and the system being inside a poor airflow environment, the minimum temperature of the device at time $T_4$ may not be as low as at time $T_2$.

Notwithstanding these effects, between $T_4$ and $T_5$, another wake or update period may be performed. This period may be the same or different in duration as the previous wake or update period depending, for example, on the operations to be performed as determined by the network traffic. For illustrative purposes, the duration of the wake or update period between $T_4$ and $T_5$ is shorter than the previous wake or update period.

As the device continues to operate in the unattended state, intermittent wake/update periods are performed with the consequence of the operating temperatures of the device steadily increasing. The rate and extent to which the temperature rises may be exacerbated if the device is placed in a bag. Being inside a bag or other confined space prevent heat from being dissipated properly, which contributes to the overall upward temperature trend during the unattended state.

Eventually, the device skin may hit a predetermined or ergonomic temperature limit, which may violate safe operation specifications. The system may need a much longer time to cool in order to come back within safe operational limits. Without sufficient cooling time in between successive or subsequent wake or update periods, the temperature of the device may not be adequately compensated and may therefore stay in an unsafe operating range or, even worse, may keep climbing. The durations of these additional wake or update periods may be longer or shorter as determined by the network traffic.

After time $T_N$ in this illustration the user may resume active use of the device. At this point unattended wake/update operation transfers the control of the device to operating system, and waits for next unattended operation. It is expected that the device should meet all necessary ergonomic specification for attended active use.

In accordance with one embodiment, the processor of FIG. 1 may perform adaptive thermal control by choosing to perform one or more thermal control solutions throughout the unattended state of operation of the device. The control solutions may differ, for example, based on the type of device (e.g., whether the device is a mobile smart phone or a notebook computer) and may be implemented using different subsystems and or operating software code.

In at least one embodiment, operations may be performed by logic at least portion of which is hardware.

Figure 4:
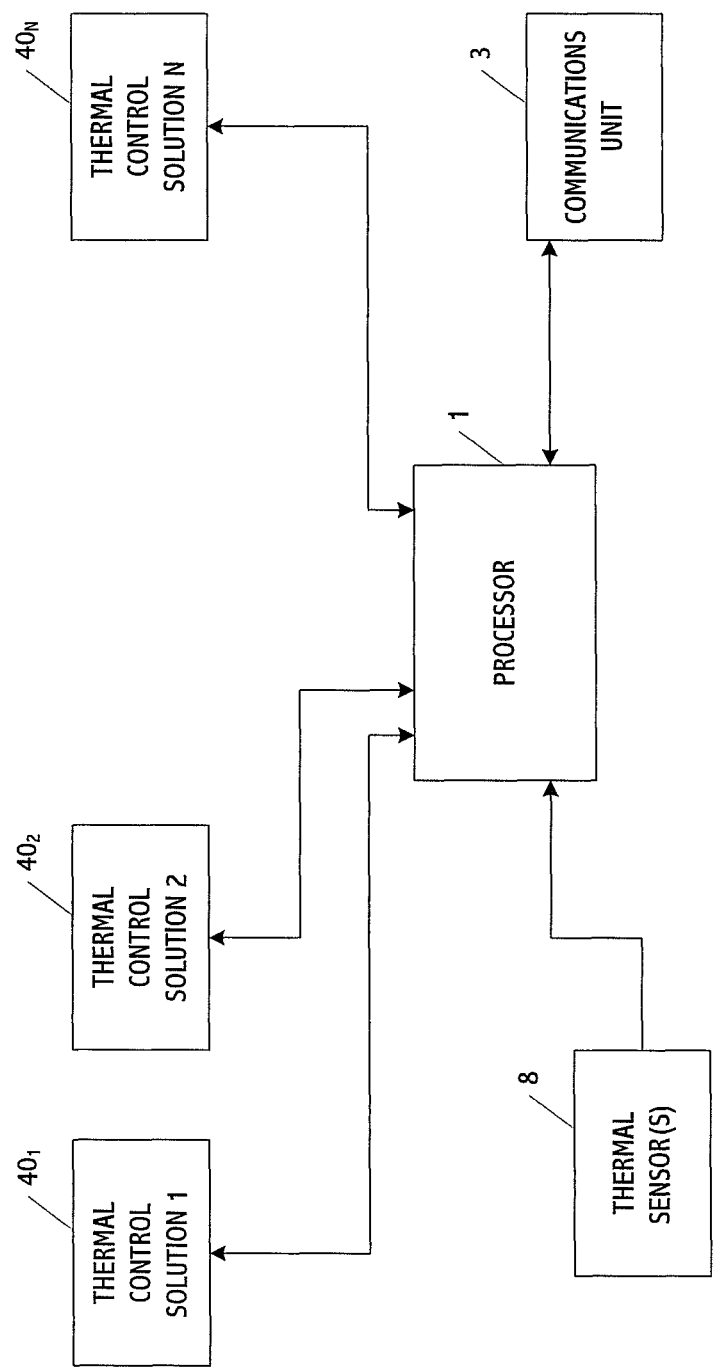
FIG. 4 shows thermal control solutions for adaptive thermal control.

FIG. 4 shows an example of an adaptive control system implemented using the processor in FIG. 1. In this example, the processor is coupled to a plurality of thermal control solutions $40_1$, $40_2$, . . . , $40_N$ which may be individually selected or selected in combination to control the temperature of the device during an unattended state of operation.

The thermal control solutions may be implemented in software, firmware, hardware, or all, and may be a proactive (for efficient control), reactive (to avert catastrophe) controls or a combination thereof. When implemented in software, the thermal control solutions may correspond to instructions stored in control software accessible by the processor. Control software may or may not be included in the operating system software. When implemented in hardware, the solutions may correspond to one or more circuits that regulate power to certain components, functions, or subsystems of the device or which otherwise control the device to reduce or manage the power consumption.

According to one implementation, the thermal control solutions any combination or even all of the following solutions which may be selectively activated by the processor according to the control software.

First Thermal Control Solution

A first thermal control solution involves introducing a time lag or delay before the first wake/update operation during the unattended period. This solution is implemented as a proactive control for the system. The timer or a timer function may be included in the software policy of the device to ensure sufficient cooling of the device and compliance with device tolerances and specifications, for example, before a first wake or update operation in the unattended state. The length of the time lag or delay may vary, for example, from device to device. According to the illustrated example in FIG. 2 and FIG. 3, the time lag corresponds to the time period between $T_1$ and $T_2$.

According to one implementation, when the device is operating in the attended state, the device may be at full power and circuits, functions, and subsystems of the device may be running at near-specification levels. When the unattended state is initiated, the device may be placed in a sleep state or other lower power condition. As a result, the device temperature may begin to cool.

However, the cool-down rate may be impeded, for example, if the device is located in a carry bag (e.g., a notebook bag, back pack, etc.) or other non-thermally conducive environment including one with poor air circulation or ventilation. This effect may be more complex to manage at the beginning of the unattended state as temperature of the device redistributes with a change of boundary condition and becomes more uniform.

Second Thermal Control Solution

When a wake operation is performed during the unattended state, the device may attempt to reach the active state as soon as possible. This may produce a high initial power spike. This, in turn, may cause a steep temperature rise in one or more components of the device before heat spreading takes effect. Software may be included to try to minimize this effect, for example, by limiting initial power from reaching high power turbo states.

Third Thermal Control Solution

A third thermal control solution is to place the device (e.g., one or more predetermined circuits or functions of the device) in a lower or lowest possible active power mode. According to one example, the lowest possible power mode is illustrated as P2 in FIG. 2.

Utilization of the lowest available active power during an unattended wake/update may be considered a proactive control feature. After the initial power spike at unattended wake, the system power adjusts to support unattended update workload. The unattended update workload may correspond to, for example, an email or message transfer or another operation, e.g., one that is not necessarily calculation or graphics intensive.

In implementing this third solution, a low power ceiling at this stage may not impact performance while diminishes the upward temperature drift. On the other hand, the power level at this stage is one key factor that determines or modulates total energy consumption by the device and the extent of temperature rise in an unattended wake/update cycle. This is because this stage persists for almost the entire duration of the wake or update during the unattended state. Therefore the power level, and correspondingly the resultant temperature rise, may be minimized by limiting one or more predetermined components to the lowest available active state or by altogether disabling these components.

According to one example, these components may include the central processing unit (e.g., CPU may be limited to a specific lower or lowest power state Pn), one or more cores or platform components of the device (e.g., reducing the number of cores from a multi-core processor), and/or a graphics core processor (e.g., gating power from graphics core), communication circuit (e.g., placing it in the lowest activity state), etc.

Fourth Thermal Control Solution

A fourth thermal control solution is to place an upper constraint on the duty cycle of wake-to-sleep durations to prevent the temperature of the device from rising above a predetermined threshold level. This level may correspond, for example, to a predetermined or preset unsafe operating temperature or power level for the device. The duty cycle constraint is considered a proactive control measure and may be applied during the unattended wake/update state. This control measure ensures a longterm thermal control of a system.

In accordance with one implementation, as the worst thermal boundary conditions (e.g., elevated ambient temperature of 35° C. of the device during 'in-bag' operation) are assumed to exist during the unattended wake/update state, the device power may be controlled to correspond to a level that can be safely dissipated under these conditions. This may be achieved, for example, by limiting the duty-cycle of unattended wake/update operation within a specific limit, wherein the duty-cycle is defined using the proportion of the higher power wake/update period and the lower power sleep period.

An example of duty cycle constraint may be explained relative to FIG. 2. As shown in this figure, one duty cycle may be between times $T_1$ and $T_3$, where the device is in low power sleep mode $P_3$ between $T_1$ and $T_2$ and is in moderate power active mode $P_2$ (greater than $P_3$) between $T_2$ and $T_3$. As shown in this figure, the duty cycle may change from cycle to cycle of an unattended wake/update operation. The duty-cycle constraint places an upper limit of on the proportion of how big the wake portion could be compared to the sleep portion of a cycle.

A heuristically determined duty-cycle limit may be predetermined and instituted in the software policy to maintain system power within a safe ergonomic limit. A calculation may be performed to determine the subsequent sleep (of low power) period near the end of every unattended wake/update period to ensure meeting of this duty-cycle constraint. For example, a cycle may be considered to exist between $T_2$ and $T_4$. If the duration of the wake/update period (between $T_2$ and $T_3$) is too long, then to fit within the duty-cycle constraint (e.g., a value preprogrammed into the operating system software), the duration of the subsequent sleep period (between $T_3$ and $T_4$) may be increased to fit within the constraint as a way of controlling thermal efficiency.

Fifth Thermal Control Solution

A fifth thermal control solution is to perform feedback control for preventing the device temperature from exceeding a predetermined level, set, for example, based on an unsafe predetermined temperature. For some applications, this solution is considered a reactive control measure and may be needed to provide a short-term thermal control of the device.

However, at times, there may be occasions (e.g., high network traffic) that can cause long wake/update duration, and in turn, cause high temperature rise in the device. Fortunately, the component power levels during an unattended wake/update operation may be non-aggressive. Therefore, risk is low for the components to violate operating temperature specifications during a long wake or update operation.

When operating in a carry bag, this may create temperature increase uniformly across the entire device and, consequently, long wakes or updates may cause the skin (e.g., housing, external components, touch-pads, etc.) of the device to violate ergonomic specifications for safe operation.

As a solution, software may be included in the device to monitor signals from one or more temperature sensor placed throughout the device for feedback and control of such a situation. The sensors may include a direct skin temperature sensor (if equipped), or any other sensor that correlates well with skin temperature and thus can be used as skin temperature proxy, (e.g., a maximum temperature of the device before shut down is performed). An example of skin temperature proxy is CPU Tj, where junction temperature is found to correspond well to skin temperature trend. A combination of sensors may also be implemented in some embodiments. A threshold temperature may be set to be selected that can provide a guard-band and time for control before actual violation happens.

Sixth Thermal Control Solution

A sixth thermal control solution may be to perform an exponential thermal back-off operation to provide quick and efficient temperature control for the device. This solution may be considered a reactive measure performed based on feedback or signals from one or more sensors. When one of the temperature sensors reports a temperature which is higher than a threshold temperature, control software utilizes a pre-programmed exponential thermal back-off policy to alleviate this situation quickly. This policy may involve increasing a sleep or lower-power period during the unattended state in order to give the device more time to cool-off.

For example, when a temperature threshold limit is detected to be exceeded by the device (or one or more portions of the device), the duration of the subsequent sleep period during the unattended state may be multiplied by a predetermined factor N (e.g., 2). Increasing the sleep duration in this manner allows the device to cool for a longer period of time than originally programmed. In many cases, this increased cool-off time is sufficient to regulate thermal conditions of the device.

In other cases, however, the cool-off time provided by the increased sleep duration may still be insufficient for purposes of lowering the temperature to certain levels. For example, if a sensor reports that the same or another threshold has been exceeded in the very next duty cycle, the duration of the sleep period in a next cycle may be extended yet again by the same or another factor. For example, if the same factor (2) is used again, the duration of the sleep period will be 4 times the duration of the sleep period during the next cycle. This exponential back-off may continue until the sensor reports a temperature that is below the threshold value. At this time, the sleep multiplier N may then be reset to 1 for immediate recovery to an original sleep target.

Figure 5:
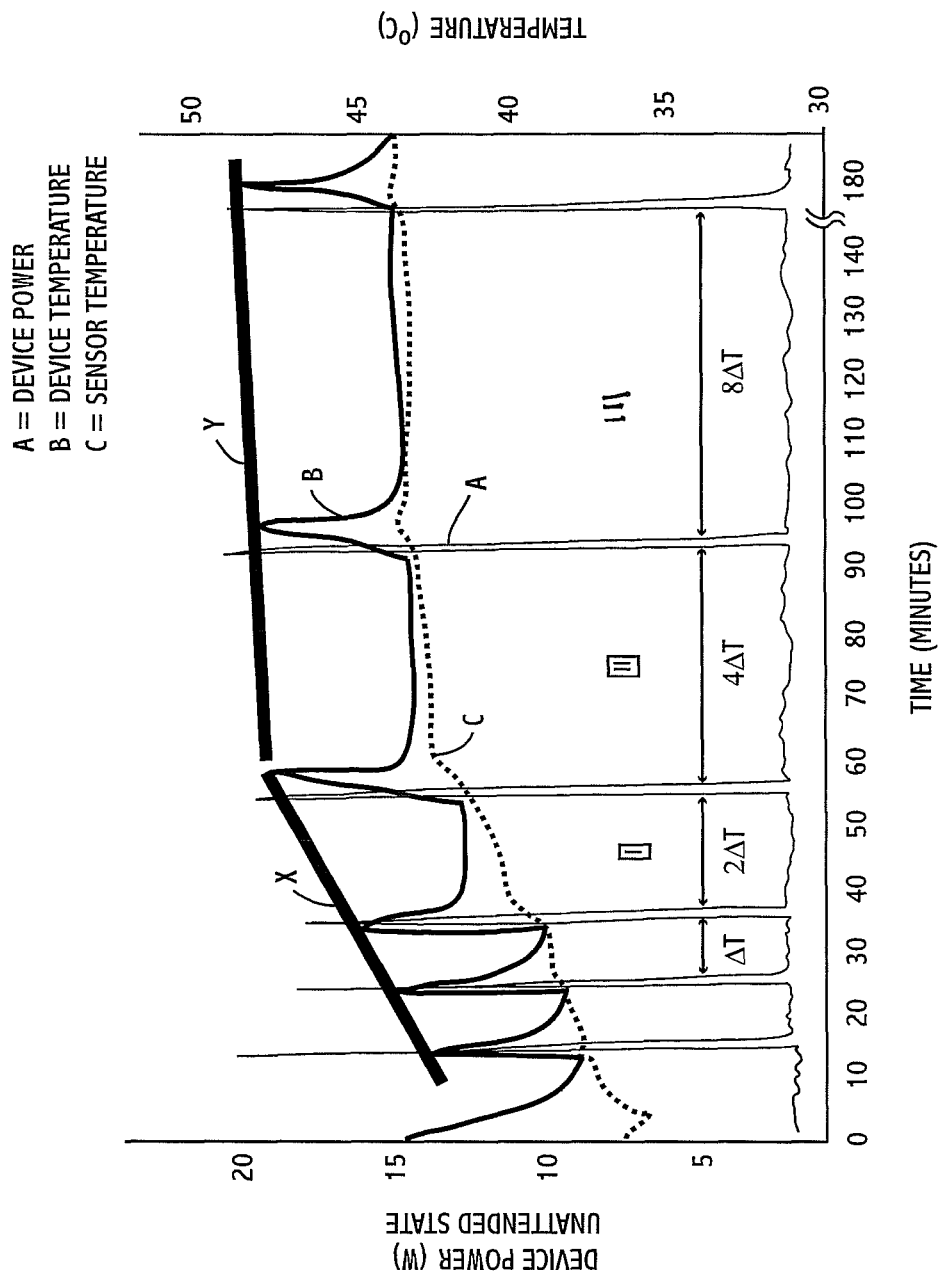
FIG. 5 shows an example of an exponential thermal back-off solution.

FIG. 5 shows an example of implementing the exponential thermal back-off solution to a mobile device operating in the unattended wake/update state. In this Figure, curve A corresponds to power of the device, curve B corresponds to temperature of the device or of a certain device component (e.g., CPU), and curve C corresponds to temperature readings taken by a skin or other device sensor. The duration of the spikes in the power curve correspond to times when wake or update operations are performed, and the duration between the spikes in the power curve correspond to lower-power sleep periods.

The solution begins in the time period corresponding to Period I. During this period, the sensor temperature exceeds a predetermined threshold or the device temperature exceeds a predetermined threshold, or both. At this point, the operating system or other software causes the device processor to begin increasing the lower-power sleep periods exponentially throughout successive subsequent unattended wake/sleep cycles until a spec compliance is reached.

Thus, in Period I, the duration of the lower power sleep period ($2\Delta T$) is equal to two times ($2\times$) the duration of the sleep in the previous (and original target) cycle ($\Delta T$). In Period II, the duration of sleep is yet again increased by a factor 2 ($4\Delta T$) is four times ($4\times$) the duration of the sleep in the original cycle ($\Delta T$). And, in Period III, the duration of sleep ($8\Delta T$) is eight times ($8\times$) the duration of original sleep target. The exponential thermal back-off solution continue until a sensor or device temperature does not exceed the predetermined threshold anymore.

The result of this exponential thermal back-off control is shown by trend lines X and Y. Trend line X shows that the temperature of the device is increasing at a rapid rate (as is evidenced by the steep slope of this curve) and has triggered the exponential thermal back-off control mechanism. Trend line Y shows that the temperature of the device stabilizes to acceptable levels under an unsafe maximum level where damage could occur in the device, e.g., a level corresponding to a specification (for example, ergonomic) limit. This stabilization results from successively increasing the lower power (e.g., sleep) period in the duty cycles corresponding to Periods I, II and III.

Seventh Thermal Control Solution

A seventh thermal control solution is to place a limitation on the length of the individual wake duration in unattended wake/update operation. This may be based on one or more reliability safeguards of one or more hardware circuits or subsystems of the device.

In this solution, the duration of wake may be limited to a predetermined maximum value programmed into the operating system or other control software. This limits the time the device is in a higher power state, which will translate into limiting the increase in temperature of the device during the unattended wake/update operation. The predetermined maximum duration of wake may, for example, be based on hardware reliability safeguards. In this way, the seventh solution may implement a proactive control measure.

The target of the seventh solution is to keep the additional cycles during unattended wake/update operation as mini-cycles and prevent adding any hardware reliability concerns over the normal thermal/power cycling design point of the device. These cycles are referred to as mini-cycles because the corresponding temperature swings are much smaller than that of a regular power cycle used in the device's design point. For example, the temperature swing in a mini-cycle may be 5 to 10° C. compared with the temperature swing during a regular power cycle (40 to 50° C.). The smaller temperature swings may not only limit the amount of temperature rise of the device but may also have an insignificant negative impact the reliability of ball grid array (BGA)-type hardware in the device.

Eighth Thermal Control Solution

The eighth solution involves a reactive control measure for some extreme situations that may lead unattended wake/update to reach the allowable maximum limit consecutively and continuously. Several repetitions of long wake cycles likely will cause the sensor to surpass temperature threshold. For any occurrence of 'allowable max' wake period, the subsequent sleep is already long (in the neighborhood of 30 mins, as per the duty-cycle constraint). So repeat exponential back-offs from this point will render fresh content feature practically useless. To avert this situation, after observing two consecutive occurrences of 'allowable max' wake durations, the subsequent maximum is reduced to a heuristically determined 'reduced max' value. The will still provide a frequent enough content update with acceptable sleep duration, and will allow time for system to recover from this abnormal situation. While working under the 'reduced max' limit, when the system does not hit the new limit, the original 'allowable max' limit is immediately reinstated. More specifically, in some situations, the temperature during wake or update operations performed during the unattended state may reach or exceed an allowable maximum limit continuously over consecutive cycles. This may occur or be increased, for example, as a result of repetitions of long wake cycles that cause sensor signals to surpass temperature thresholds.

Ninth Thermal Control Solution

A ninth control solution involves performing constant temperature monitoring and control during wake and/or update periods during the unattended state. If a threshold temperature corresponding to a predetermined value (e.g., set by safety limits) is reached during a wake operation, this wake operation or one or more subsequent wake operations may be terminated, to thereby employ a reactive control measure.

According to one implementation of this solution, the feedback temperature (from one of the sensors previously mentioned) is monitored continuously or in predetermined increments (e.g., every second) during a wake or update operation performed during the unattended state. If the feedback temperature is higher than a predetermined threshold (set, for example, by a safety specification) at any time, the processor may terminate the current wake or update operation to prevent overheating, and immediately invoke a lower power sleep to aid cooling of the device and/or one of the platforms or circuits in the device. If email traffic exists, a minimum wake duration may be permitted before terminating current wake. This is because each wake comes with a high energy overhead and the software solution tries to salvage the current wake overhead by staying active for a minimum duration for content update. In addition to termination of a current wake/update operation, a thermal back-off multiplier (as previously described) may also be used to determine the subsequent lower power (e.g., sleep) duration for sufficient cool-down.

Tenth Thermal Control Solution

A tenth control solution is to regulate the frequency of wake/update operations during the battery charging mode. This may reduce or otherwise compensate for the heat generated, for example, during a battery charging operation for the device. This solution may be considered as a proactive control measure.

In one implementation, while charging the battery of the device, additional heat discharge may occur at the battery circuitry especially at a low charge of system battery. This heat can cause a substantial warming of the device. This solution compensates for the additional heat by reducing the amount of heat generated during a wake or update period in one or more cycles in the unattended state, to thereby maintain the device at a safe operating temperature level. This may be accomplished by monitoring battery level during charging and regulating/retarding the number of wake or update operations performed during the unattended state when the battery charge is low. As the charge level starts increasing, the original wake frequency may gradually be reinstated.

Eleventh Thermal Control Solution

An eleventh control solution is to reduce or eliminate activation or performance of one or more circuits, functions, or subsystems of the device during the wake or update periods during the unattended state. The one or more circuits, functions, or subsystems may correspond to ones that are needed and operating during the attended state. Examples include the display, light emitting diodes (LEDs), fan, and audio circuits to name a few. This solution therefore provides a proactive control measure to managing the thermal condition of the device. The result will not only reduce battery power consumption but will also serve to reduce heat generation in the device.

According to another implementation, power to unfavorable or unnecessary operations may be reduced during the unattended state or these operations may be eliminated at this time. For example, when the temperature of the device is determined to equal or exceed a certain threshold level (e.g., an upper limit set to prevent damage to the circuits or operation of the device), operating software may assume that the device is located in a carry bag where thermal heat dissipation is not possible or severely limited.

Under these circumstances, device fans are useless and unfavorable because they do not sustain cooling and only drain battery power. Furthermore, in-bag use may cause the devices air vents and passages to be clogged or blocked with hair, dust, debris, or the inner walls of the bag and/or its contents. Under these circumstances, the fan and/or other device functions or operations may be turned off, for example, until the device returns to an attended state.

Twelfth Thermal Control Solution

A twelfth control solution is to set threshold levels for operating power and temperature for the device based on different form factors, skin materials and/or thermal sensors in the device. A version of this solution has been previously explained.

Thirteenth Thermal Control Solution

A thirteenth control solution is to perform a fail-safe operation to protect the integrity of the operating system, for example, including when the operating system experiences a loss of control of execution because of excessive temperatures.

According to one implementation, a thermal policy written into the operating system or other control software may allow layers of protection against a predetermined number of thermal scenarios. For example, error control circuitry can check thermal sensors and determine that the device and/or one of its platforms is operating at an unacceptable temperature level. When this occurs, device may be controlled not to perform one or more wake operations during the unattended state, but instead a wake timer may be reset to a later time to allow the device to remain in a lower power state (e.g., S3) for a longer period of time.

When device performs a wake operation in unattended state, software running on host CPU may notify the error correction circuitry. At this time, if the error correction circuitry determines that the operating system is non-responsive or otherwise not operating properly, it may be concluded that the system temperature is too high (e.g., the device or one of its platforms may have exceed an OEM-defined thermal level) and the power of the device may be turned off in response.

Fourteenth Thermal Control Solution

A fourteenth control solution may be performed by other equipment manufacturers (OEM), who may configure the device to allow for different form-factors, skin materials, and/or sensors on the device and/or on one or more of its platforms. In implementing this proactive control solution, selected controls (e.g., ones previously described) are given default values coded into the control software. The default values may set be set by the device manufacturer, but these values may not be optimal for OEM-specific systems. This is because devices may be made differently from OEM to OEM and/or from device manufacturer to OEM with different skin materials, form-factors, and different sensor capabilities.

In determining and assigning threshold or limit values for temperature and power control, the processor of the device may be driven by the operating system software to implement all or a portion of the thermal control solutions either simultaneously, successively, or intermittently, during the unattended state. This may occur as respective threshold or limit values are violated, as certain temperature or power trends appear, and or a combination of the conditions mentioned in connection with the aforementioned control solutions. The OEM or the manufacturer may set these values to give them capability to tune the unattended usage settings to match to specific needs and characteristics of the device platform(s).

An additional control solution is to allow for removal of thermal constraints when the device is being used out of its bag or holster or in another type of heat-insulative environment. This solution may follow an in-bag solution as previously described and may be considered proactive in terms of providing thermal control.

In performing this solution, the processor may initiate a query to determine whether the device is currently within a carrying bag, holster, or other environment with poor ventilation. This may be accomplished, for example, by receiving a signal indicating that the lid of a notebook computer is closed, that the device is in an AC-brick connected state, or based on other signals. If an out-of-bag condition is determined to exist, any or all the above constraints and/or solutions can be removed and active cooling (e.g., by a fan) may be allowed to support sustained usage during attended or unattended states.

All or a portion of the thermal control solutions previously mentioned may be implemented when the device is located in a carrying bag, although this is not a necessity. For example, all but the eleventh solution may have the pre-condition of determining whether the device is located in a carrying bag, holster, or is in a poor ventilation area. This may be determined, for example, based on sensed temperature levels exceeding a level that would not exist if the device were not in a bag or poor ventilation area, based on a signal indicating whether a folder or lid of the device is closed, or based on an activity level of the CPU or other processor, or based on a combination of these or other factors.

Figure 6:
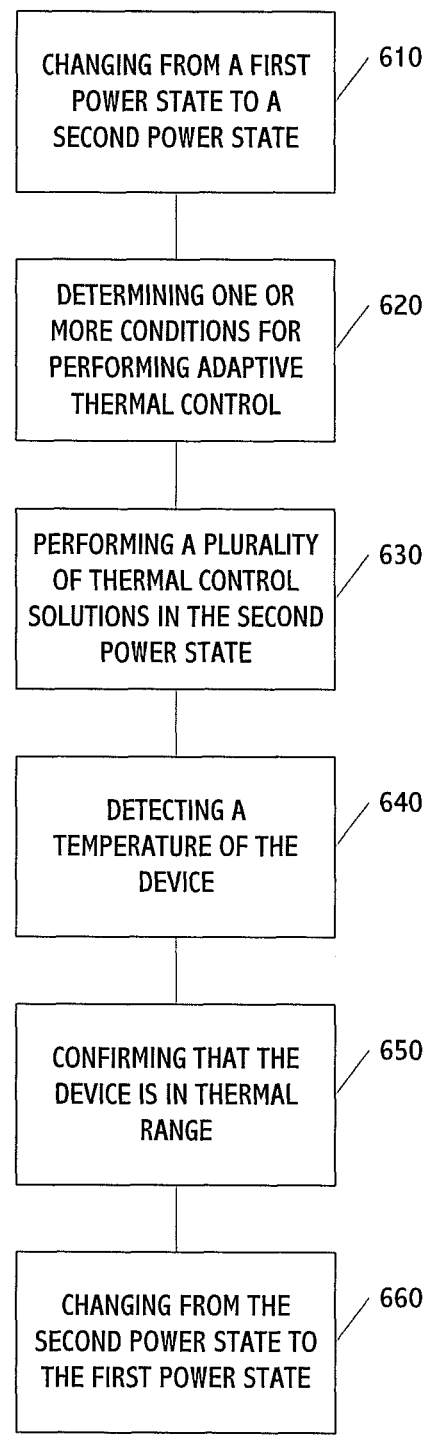
FIG. 6 shows one embodiment of a method for performing thermal adaptive control of an electronic device.

FIG. 6 shows operations included in one embodiment of a method for performing adaptive thermal control of an electronic device. The device may be any of those previously mentioned and/or may be performed by the devices shown in FIGS. 1 and 4, although a different device may be used in other embodiments.

In an initial operation, the device may change from a first power state to a second power state. (Block 610). The first power state may be a power state greater than the second power state. In one embodiment, the first power state may be full power state and the second power state may be a lower power state. When the device is a computer, the power states may correspond to different ACPI states. When the device is a smart phone or other device, a different hierarchy of power levels may be used.

When operating in first power state, the device may be considered to be in an attended state of operation. And, when operating in the second power state, the device may be considered to be operating in an unintended state of operation. In attended state, the device may be in active use by a user and/or may correspond to an out-of-bag use. In the unattended state, the device may be in an inactive state in which various cycles are performed that include wake or update periods followed by a lower-power or sleep periods as previously explained.

In the second power (unattended) state, a processor determines whether one or more conditions exist for performing adaptive thermal control. (Block 620). These conditions may be any of the conditions corresponding to the thermal control solutions previously discussed. Additionally, or alternatively, the processor may be programmed by operating system or other software to automatically perform a combination of the thermal control solutions immediately upon entry into the second power (unattended) state.

Upon entry into the second power state and/or when control software conditions, a combination of thermal control solutions (e.g., as those previously mentioned) are executed simultaneously, successively, or in tandem as the control software dictates. (Block 630). During this process, the temperature of the device and/or one of its platforms, functions, or circuits is periodically or continuously monitored to determine whether additional solutions should be employed for controlling the thermal condition of the device, whether some of the running solutions should be terminated, or a different combination of solutions should be employed. (Block 640).

During this process level of control, the processor may determine, for example, based on the output of one or more sensors that the temperature of the device is within a predetermined acceptable thermal range. (Block 650). After this, one or more of the solutions may be discontinued and/or the device may return to the first or another power state, to example, to allow for attended state operation. If the acceptable thermal range is never reached, power to the entire device may be shut down to prevent permanent damage.

In at least one embodiment, the apparatus may include logic at least a portion of which is hardware. The logic may control heat generation in a device, wherein the device to operate at least in one of a first state and a second state, wherein the device to consume more power in the first state than in the second state, wherein the device to connect to a network at least for a portion of time while in the second state. Further, logic to select at least one of a plurality of thermal control solutions to decrease the generation of heat in the device in the second state, the selected thermal control solution to be performed while the device is in the second state to reduce the generated heat to below a predetermined level.

Another embodiment corresponds to a computer-readable medium that store a program or other control instructions to adaptively control the generation of heat in an electronic device. The computer-readable medium may be read-only or other type of device capable of storing operating system or control instructions for implementing any of the embodiments described herein, including any combination of the thermal control solutions previously described.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
   logic at least a portion of which is hardware, the logic to:
      control heat generation in a device, wherein the device to operate at least in one of a first state and a second state, wherein the device to consume more power in the first state than in the second state, wherein the device to connect to a network at least for a portion of time while in the second state; and
      in response to the device to change from the first state to the second state, select at least one of a plurality of thermal control solutions to decrease the generation of heat in the device in the second state, the selected thermal control solution to be performed while the device is in the second state to reduce the generated heat to below a predetermined level, wherein the device to operate at a first power level during a wake/update period of the second state and the device to operate at a second power level during a sleep period of the second state, and wherein the device to operate at a higher power level and to sleep at a lower power level,
   a wake/update operation to be performed at the higher power level in the wake/update period, while the device is in a second state, and
   the device to be in a sleep state in the sleep period, while the device is in the second state.

2. The apparatus of claim 1, wherein the logic is part of a processor.

3. The apparatus of claim 1, wherein the logic to control heat generation in the device based on power management instructions.

4. The apparatus of claim 3, further comprising a storage area to store the power management instructions.

5. The apparatus of claim 3, wherein at least a portion of the thermal control solutions to be implemented by the power management instructions.

6. The apparatus of claim 1, wherein the first state to be an attended state of the device, and the second state to be an unattended state of the device.

7. The apparatus of claim 1, wherein connectivity of the device to the network to be continuously accessible or accessible under control by a user in the first state, and wherein connectivity of the device to the network to be limited during the second state and is not subject to control by the user.

8. The apparatus of claim 1, wherein heat generated in the device during the sleep period is less than heat generated by the device during the wake/update period.

9. The apparatus of claim 1, wherein the device to be connected to a network to update information during the wake/update period while the device is in the second state, and wherein the device may or may not be connected to the network during the sleep period while the device is in the second state.

10. The apparatus of claim 1, wherein one of the selected thermal control solutions includes to increase a duration of the sleep period.

11. The apparatus of claim 1, wherein:
    the wake/update period and the sleep period alternate during the second state, and
    one of the selected thermal control solutions to progressively increase durations of the sleep periods.

12. The apparatus of claim 1, wherein one of the selected thermal control solutions to enforce a duty cycle limit during the second state, wherein the duty cycle is defined using a proportion of the wake/update period and the sleep period.

13. The apparatus of claim 1, wherein one of the selected thermal control solutions to limit a duration of the wake/update periods to be performed during the second state.

14. The apparatus of claim 1, wherein one of the selected thermal control solutions to limit a rate or frequency of the wake/update events during the second state.

15. The apparatus of claim 2, wherein the processor to receive a sensor signal indicative of a temperature of the device, and wherein one of the selected control solutions to reduce power to one or more circuits or function of the device based on the sensor signal.

16. The apparatus of claim 2, wherein the processor to receive information indicating that the device is in a carry bag, and wherein one or more of the selected thermal control solutions to be performed based on the information indicating that the device is in the carry bag.

17. A method to control generation of heat in a device, comprising:
    changing operation of the device from a first state to a second state; and
    in response to changing operation of the device from the first state to the second state, selecting at least one of a plurality of thermal control solutions to decrease generation of heat in the device in the second state, wherein the device to consume more power in the first state than in the second state, wherein the device to connect to a network at least for a portion of time while in the second state, and wherein the selected thermal control solutions to be performed while the device is in the second state to reduce the generated heat to below a predetermined level, wherein the device to operate at a first power level during a wake/update period of the second state and the device to operate at a second power level during a sleep period of the second state, and wherein the device to operate at a higher power level in the wake/update period than in the sleep period,
    a wake/update operation to be performed at a first power in the wake/update period while the device is in the second state,
    the device to be in a sleep state or to operate at a second power in the sleep period while the device is in the second state, wherein the second power is less than the first power.

18. The method of claim 17, wherein the first state to be an attended state of the device, and the second state to be an unattended state of the device.

19. The method of claim 17, wherein connectivity of the device to the network to be continuously accessible or accessible under control by a user in the first state, and wherein connectivity of the device to the network to be limited during the second state and is not subject to control by the user.

20. The method of claim 17, wherein at least a portion of the thermal control solutions to be implemented by power management instructions.

21. The method of claim 17, wherein heat generated in the device during the sleep period is less than heat generated by the device in the wake/update period.

22. The method of claim 17, wherein the device to be connected to a network to update information during the wake/update period, and wherein the device may or may not be connected to the network during the sleep period.

23. The method of claim 17, wherein one of the selected thermal control solutions includes a solution to increase a duration of the sleep period.

24. The method of claim 17, wherein:
the wake/update period and the sleep period alternate during the second state, and
one of the selected thermal control solutions to progressively increase durations of the sleep periods.

25. The method of claim 17, wherein one of the selected thermal control solutions to enforce a duty cycle limit during the second state, wherein the duty cycle is defined using a proportion of the wake/update period and the sleep period.

26. The method of claim 17, wherein one of the selected thermal control solutions to limit a duration of the wake/update periods to be performed during the second state.

27. The method of claim 17, wherein one of the selected thermal control solutions to limit a rate or frequency of the wake/update events during the second state.

28. The method of claim 17, further comprising receiving a sensor signal indicative of a temperature of the device, and wherein one of the selected control solutions to reduce power to one or more circuits or function of the device based on the sensor signal.

29. The method of claim 17, further comprising receiving information indicating that the device is in a carry bag, and wherein one or more of the selected thermal control solutions to be performed based on the information indicating that the device is in the carry bag.

30. The apparatus of claim 1, wherein during the wake/update period, the device is connected to the network.

31. The apparatus of claim 1, wherein the logic to select at least one of a plurality of thermal control solutions includes to select at least two different thermal control solutions to decrease the generation of heat.

32. The method of claim 17, wherein during the wake/update period, the device is connected to the network.

33. The method of claim 17, wherein the logic to select at least one of a plurality of thermal control solutions includes to select at least two different thermal control solutions to decrease the generation of heat.

* * * * *